United States Patent [19]

Winebaum et al.

[11] Patent Number: 4,941,172
[45] Date of Patent: * Jul. 10, 1990

[54] PREPROGRAMMED AUTODIALER AND RELATED PROCESS

[75] Inventors: Jacob J. Winebaum, Washington, D.C.; Alan J. Rider; Lester R. Querry, both of Reston, Va.

[73] Assignee: U.S. News, Washington, D.C.

[ * ] Notice: The portion of the term of this patent subsequent to Mar. 28, 2006 has been disclaimed.

[21] Appl. No.: 307,941

[22] Filed: Feb. 9, 1989

Related U.S. Application Data

[63] Continuation-in-part of Ser. No. 124,579, Nov. 24, 1987, Pat. No. 4,817,135.

[51] Int. Cl.$^5$ .............................................. H04M 1/26
[52] U.S. Cl. .................................... 379/355; 379/352
[58] Field of Search ............... 379/352, 355, 354, 356, 379/357, 359, 216; 200/266, 267, 268, 512, 513, 514, 515

[56] References Cited

U.S. PATENT DOCUMENTS

| | | | |
|---|---|---|---|
| 4,126,768 | 11/1978 | Grenzow | 379/357 |
| 4,243,861 | 1/1981 | Strandwitz | 200/267 X |
| 4,400,595 | 8/1983 | Ahumada | 200/515 X |
| 4,485,279 | 11/1984 | Nakamura | 200/575 X |
| 4,694,126 | 9/1987 | Aiken, Jr. et al. | 200/514 X |
| 4,817,135 | 3/1989 | Winebaum | 379/216 X |

OTHER PUBLICATIONS

B. A. Pargh Company, Inc., Spring 1985 Catalog, p. 266.
"One Key Dialer", article, publication date unknown, pp. 1-4.
Alcraft document (one page).

Primary Examiner—James L. Dwyer
Attorney, Agent, or Firm—Nixon & Vanderhye

[57] ABSTRACT

An automatic telephone number dialing service for use with mass-distribution media products to enable consumers to automatically dial a preprogrammed number associated with one or more sources of goods and/or services. The device may be constructed as an insert for, or attachment to, various media such as magazines, books, direct mail advertising, newspapers and the like. The device may also be constructed as a customized service card for accessing sources of products or services. The preprogrammed number may be that of a centralized, automated, or personal telemarketing system. The dialing device includes a single chip microprocessor capable of producing DTMF tones corresponding to the preprogrammed telephone. By passing the tones through a miniature speaker or other sound transducer, the preprogrammed number will be automatically dialed. A related telemarketing process using the device is also disclosed.

45 Claims, 10 Drawing Sheets

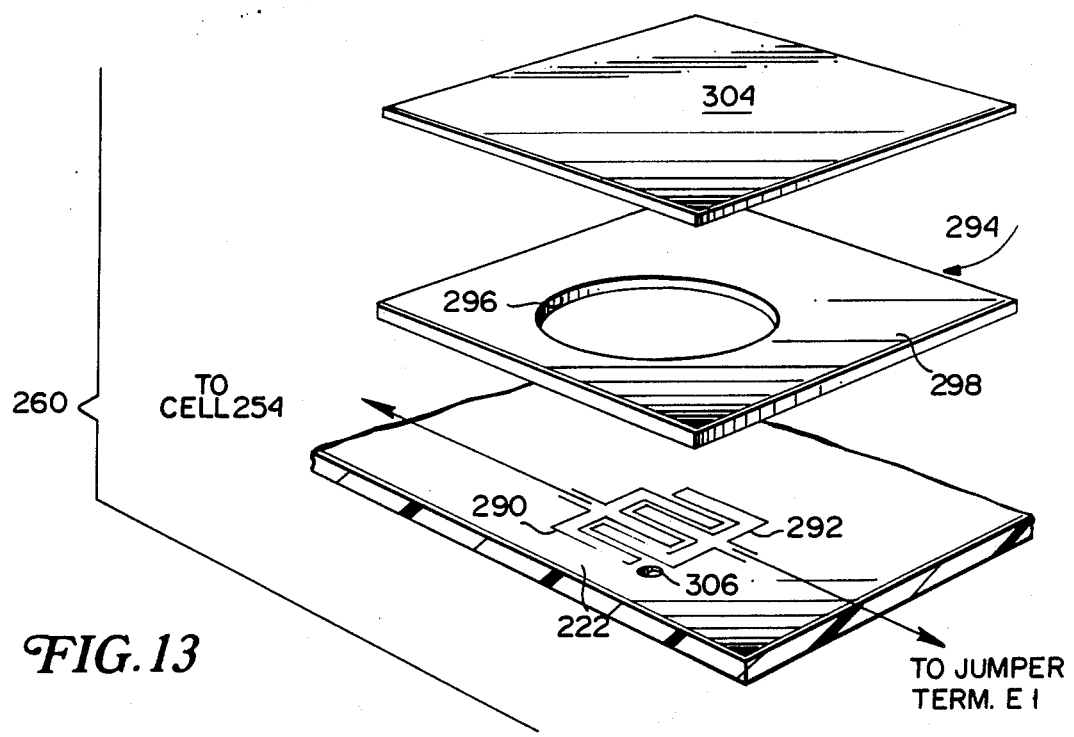
FIG. 13
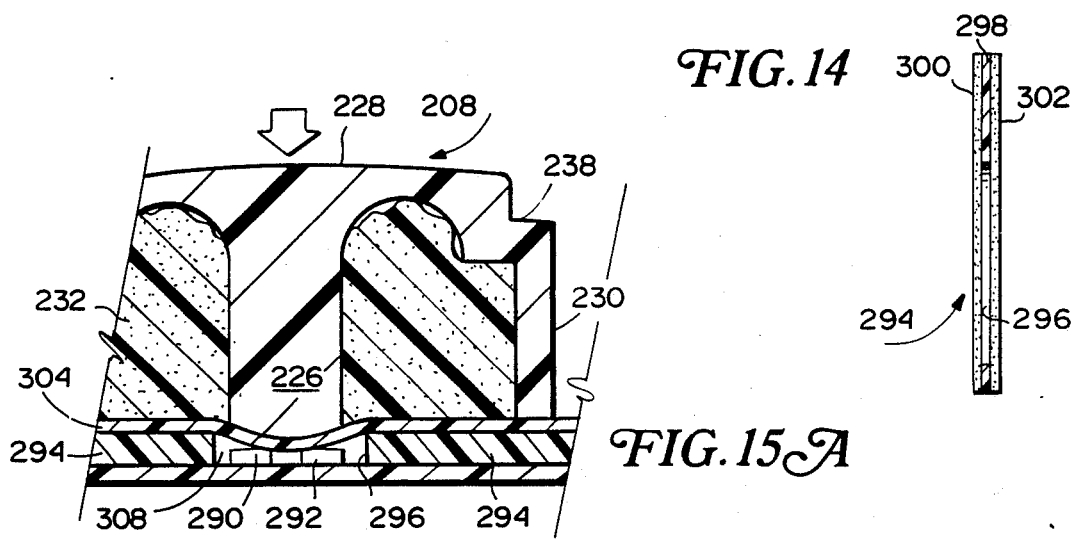
FIG. 14
FIG. 15A
FIG. 15B

PREPROGRAMMED AUTODIALER AND RELATED PROCESS

CROSS-REFERENCE TO RELATED APPLICATION

This application is a continuation-in-part of commonly assigned copending application Ser. No. 07/124,579 filed Nov. 24, 1987 entitled "Mass-Distributed, Preprogrammed Automatic Dialing Mechanism and Related Processes", now issued as U.S. Pat. No. 4,817,135. The entire disclosure of this parent application is expressly incorporated herein by reference.

BACKGROUND AND SUMMARY OF THE INVENTION

This invention relates to an automatic telephone dialing mechanism separably attached to various mass-distributed inert media formats such as books, magazines, newspapers, direct mail packages, etc., or incorporated into customized personal service cards, for connecting a consumer with interactive media such as centralized telemarketing systems and the like.

Various types of telephone related interactive purchasing or other marketing-type systems are known.

For example, in U.S. Pat. No. 4,071,697, there is disclosed a complex interactive purchasing system which enables a user's television to become a shopping terminal. The T.V. antenna receives broadcast signals from a transmitter station including a centralized computer system, and feeds the signals through a controller which continuously modulates and decodes the RF information. From the decoded information, the controller recognizes the address of discrete blocks of information as they are received. The viewer selects the block of information which he wants to see by means of a keyboard provided on the controller. The viewer may also indicate that he/she desires to purchase a particular item displayed on the T.V. by depressing the appropriate keys on the keyboard. The controller then generates DTMF dialing tones corresponding to the telephone number of the store from which the item may be purchased, and feeds the signals to an associated acoustic coupler on which the hand set of the user's telephone rests. In this manner, the telephone number of the appropriate store is automatically dialed.

There as also been some limited utilization of a marketing system involving broadcasting dual tone multifrequency (DTMF) signals, i.e., the "touch tone" signals heard when dialing a pushbutton telephone, over television and/or radio, thereby allowing consumers to have a predetermined telephone number automatically dialed merely by holding a telephone next to the television or radio speaker. This system has undesirable constraints insofar as the consumer's telephone must be located close to the television and/or radio, and use of the system is limited to the specific broadcast periods. Moreover, technological problems may be created by the simultaneous automatic dialing of a single number by, potentially, thousands of consumers.

There are many other interactive systems involving automatic dialing of telephones. For example, in U.S. Pat. No. 4,456,925, the patentee proposes to integrate a telephone with a standard television receiver so that repertory stored telephone numbers may be recalled for display on the television receiver screen before being automatically dialed.

U.S. Pat. No. 4,490,579, discloses a radio paging receiver having a memory for storing caller's telephone numbers. The pager is also provided with a converter which supplies DTMF tones corresponding to the caller's telephone number, so that with the aid of an amplifier and audio speaker, the caller's number can be recalled from the pager memory and automatically dialed by holding the pager over the microphone of a telephone.

U.S. Pat. No. 4,535,204, discloses optical reading of telephone numbers stored in a barcode format on various types of storage media, followed by automatic dialing of a telephone number after a user passes a reading wand over the proper barcode.

U.S. Pat. No. 4,644,107 discloses an entirely voice controlled telephone dialing system utilizing voice recognition techniques and visual displays.

In U.S. Pat. Nos. 4,107,467 and 4,451,701, systems are disclosed by which users at remote locations can access host computers by telephone.

In accordance with the present invention, mass-distributed (via subscription, direct mail, or retail sales) print or other media is relied upon to distribute mechanisms by which individual consumers, at locations and times of their own choosing, can have automatic access to centralized information systems or other sources of products or services. More specifically, the present invention relates to an automatic telephone dialing mechanism preprogrammed to automatically dial a single telephone number, typically, but not necessarily, a 700, 800 or 900 area code number. The automatic dialing mechanism is intended to be associated with various kinds of inert media, such as magazines (including catalogues), books, newspapers, direct mail packages advertising product and/or services, etc.

Alternatively, the automatic dialing device may be incorporated into customized service cards such as personal business cards, long distance dialing cards (for dialing phone company access or charge numbers), credit cards and the like.

In general, the invention includes a single microchip preprogrammed to store and recall a specific predetermined telephone number and to produce a corresponding train of DTMF dialing tone signals; a speaker; a battery; and a switch for actuating the device, all of which are mounted on a substrate constructed of relatively stiff but flexible paper, paperboard, plastic or other suitable material.

As will be appreciated, the automatic dialing mechanism can be utilized repetitively, depending only on the life of the battery, which could be made replaceable for certain applications if so desired.

The single chip microprocessor includes a tone generator which converts the microprocessor-stored information, i.e., the telephone number, into corresponding DTMF tones which are applied to a speaker or other sound transducer. The switch mechanism, which may be a simple Mylar-type switch conventionally used on melody greeting cards and the like, permits the user to activate the automatic dialer whenever and wherever he/she chooses. Simply by actuating the device and holding it next to the microphone of a telephone, the preprogrammed number is automatically dialed to connect the user with the information, product, service, or other source.

In accordance with one exemplary embodiment of the invention, the automatic dialing mechanism is removably bound into magazines or books, in association with related advertising. For example, a one or two page advertisement for products, services, subscriptions, etc. will include an automatic dialer mounted on a two-ply card attached between the pages of the magazine or book in a manner similar to subscription cards and other "mail-in" type cards. Typically, the card will contain printed matter relating the card to the advertisement, along with instructions on how to use the card. The preprogrammed telephone number will connect the user directly with the company featured in the advertisement, a telemarketing center, or other information source.

In a related aspect, the magazine may be in the form of a catalogue by which the user may order products or services by phone. The present invention permits the user/consumer to directly and quickly access the source, thus eliminating the need for filling out order forms, and mailing delays.

Where the magazine or other media format contains products from a number of sources, the telephone number may connect the user with a telemarketing system which will then further direct the call to the corresponding source. In an alternative mode, the card itself may include a number of extensions, for example, 1 through 10, with each extension corresponding to a particular store or other source. Once connected to the centralized telemarketing system, the user simply provides the appropriate extension number and is then directly connected to the corresponding source.

In another embodiment, the inert media format may be newspapers which include free standing inserts incorporating automatic dialing cards as previously described.

In another exemplary embodiment of the invention, the inert media format may comprise direct mail packages including automatic dialer reply cards of the type described hereinabove, as a substitute for the traditional reply-by-mail type cards.

In still another exemplary embodiment of the invention, customized and/or personalized service cards are constructed so as to incorporate an automatic dialing mechanism preprogrammed with the phone number of a product or service source distributing the card. These are particularly adapted for repetitive use applications, such as long distance telephone dialing, Dial-A-Joke, Dial-A-Prayer, stock quotations, T.V. home shopping networks, credit cards, personal business cards and the like. Additional applications are described further herein.

In each of the above embodiments, the automatic dialing mechanism per se is incorporated into a card-like structure suitable for the particular application. Generally, the card will include a two-ply arrangement with the automatic dialer mechanism mounted between the plies. The card may also include a fold-over flap portion which serves to open or close the actuating switch. It will be further understood that the components of the automatic dialer mechanism are miniaturized to the extent of permitting a card dimension on the order of four inches by two inches, or even less, depending on end use requirements. For a magazine or book insert, the card may be formed with an additional tab-like portion which can be inserted through the binding to removably attach the card. A similar arrangement may be used for newspapers, or, alternatively, the card may be attached to a free standing insert by conventional low-tack adhesive.

In related aspects, this invention concerns specific methods by which a user interacts, at the front end, with inert media to directly access an interactive media such as a telemarketing system; and to methods by which the interactive media responds to specific types of calls.

In another related aspect, the invention relates to a method of manufacturing an automatic dialing card device.

In brief summary, the present invention provides, for the first time, an automated link between inert media, consumers, and interactive media, with the significant advantage that response by the user/consumer is simplified to a degree heretofore unattainable in the prior art.

In a presently preferred embodiment in accordance with this continuation-in-part application, the invention comprises a compact "credit card" type housing which includes a unitary bottom wall and peripheral sidewall constructed of high impact styrene plastic, and a separate top wall constructed of a rigid vinyl material. The top wall of the housing is provided with an aperture at one end thereof for receiving a user actuable push button portion of a switch mechanism mounted within the housing, and the bottom wall of the housing is provided with a pattern of holes at the opposite end thereof adjacent a speaker also mounted within the housing. The above described housing has dimensions of about 76.5 mm long, 46.5 mm wide and 8.5 mm thick.

Details of the presently preferred dialing circuit, battery and speaker are also disclosed further herein.

It will be appreciated that the presently preferred cards construction may be attached to virtually any type of insert media by conventional means such as low-tack adhesive and the like. In addition, the card structure is eminently suitable for business card and related uses.

Additional objects and advantages of the subject invention will become apparent from the detailed description which follows, in further conjunction with the accompanying drawings.

BRIEF DESCRIPTION OF THE DRAWINGS

FIG. 13 is an exploded perspective view of certain switch components of the presently preferred embodiment of the invention;

FIG. 14 is a detailed section of one of the components illustrated in FIG. 13; and FIGS. 15A and 15B are partial section views of a push button actuated switch in accordance with the presently preferred embodiment of the invention.

DETAILED DESCRIPTION OF THE DRAWINGS

Figure 1:
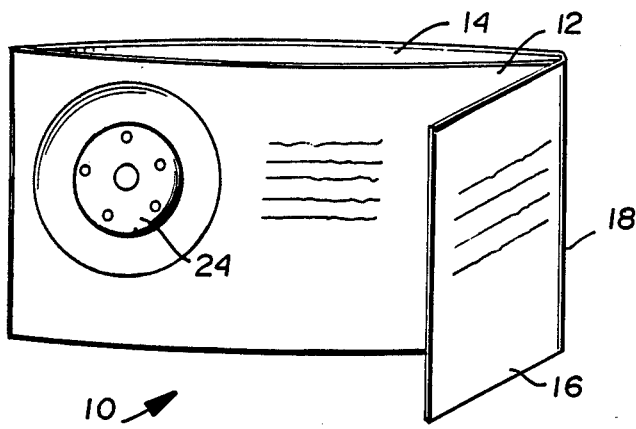
FIG. 1 is a perspective view of an automatic dialing card in accordance with an exemplary embodiment of the invention.
Figure 2:
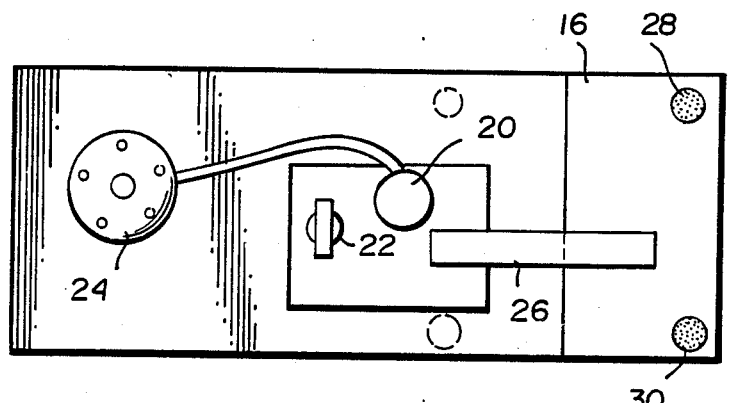
FIG. 2 is a top view of the card illustrated in FIG. 1, with the top or front ply removed.

With reference now to FIGS. 1 and 2, there is shown a substrate or card 10 incorporating an automatic dialing mechanism in accordance with one embodiment of the invention. The card or substrate 10, which may be constructed of relatively stiff but flexible paper, paperboard, lightweight cardboard, or other suitable material such as plastic, includes substantially planar front and back plies, 12, 14, respectively. This portion of the card is preferably on the order of four inches long by two inches wide, but may be smaller or larger, and have virtually any peripheral shape depending on end use requirements, user preference, etc.

At one side of the card or substrate, there is provided a fold-over flap portion 16 which is adapted to open or close about a fold line 18. The flap itself may be an extension of one of the plies 12 or 14, with the plies being connected along the fold line 18 by a suitable adhesive or other means. Flap portion 16 may also be separately formed and joined by any suitable means at the fold line 18 if so desired. As will be hereinafter explained in greater detail, a switch device is associated with the flap 16 so that when the flap is opened, the automatic dialer mechanism will be activated to generate the DTMF signals for automatic dialing of the preprogrammed telephone number.

Figure 5:
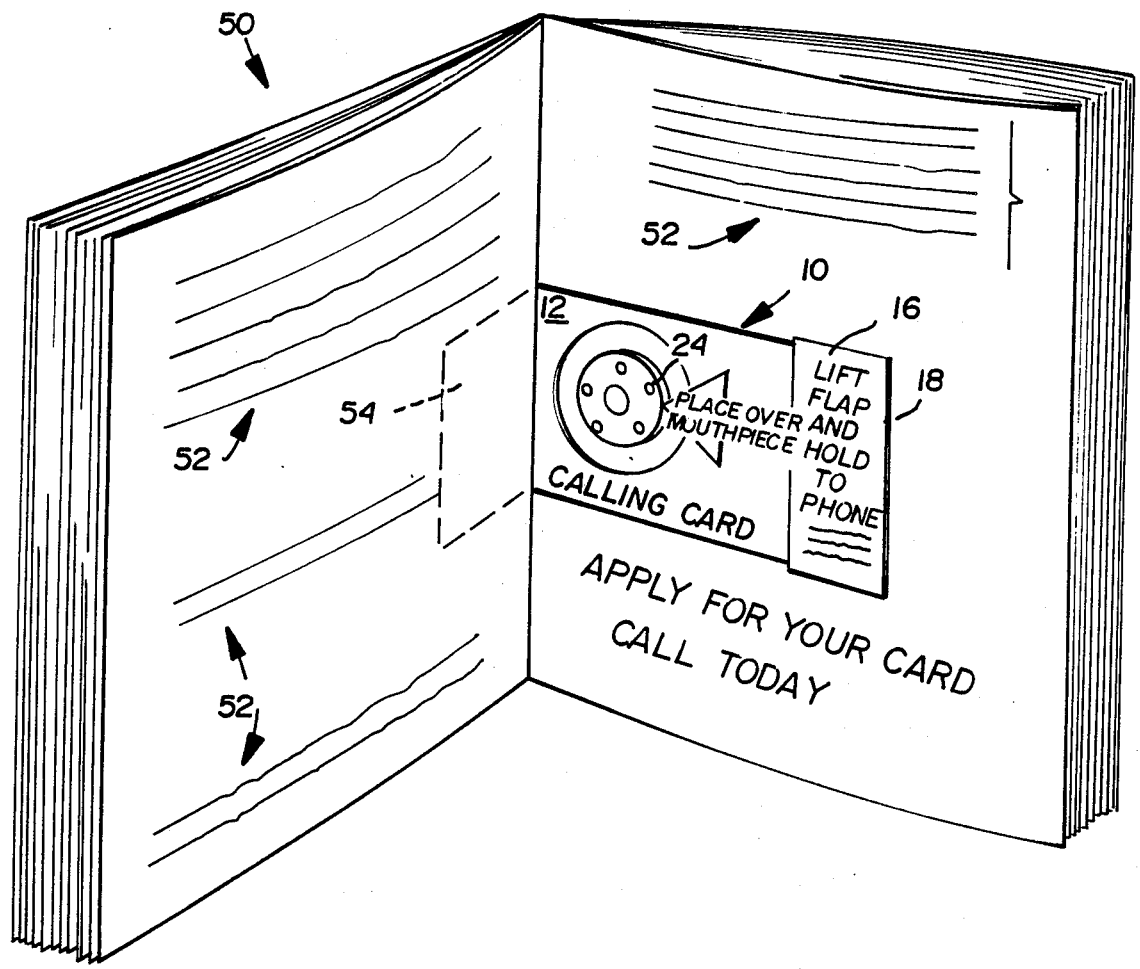
FIG. 5 is a perspective view of another exemplary embodiment of the invention.

With specific reference to FIG. 2, the automatic dialer mechanism includes a single chip microprocessor based DTMF (dual tone multi-frequency) tone generator 20, which may be a 4-bit Microcomputer model HD61827 manufactured by Hitachi, Ltd. of Japan or similar. The substrates 12 and 14 enclose the tone generator chip 20 along with an associated miniature battery (or other power source such as a solar cell) 22 and miniature speaker (or other sound transducer) 24. A conventional Mylar SPST switch 26 serves to actuate the tone generator chip 20 to generate a predetermined desired sequence of DTMF tones upon opening the flap 16. As best seen in FIG. 5, the fold-over flap portion 16 may be provided with one or more "spots" 28, 30 of low-tack, restickable adhesive for holding the flap in the closed position when not in use. This is an important feature which prevents unwanted activation of the device (e.g., during manufacturing, printing, distribution processes) and consequent wearing-down of the battery.

An appropriate time delay may be programmed into the device so that, for example, the tones are not broadcast through the speaker for five seconds after the flap is opened (e.g., thus providing time for the user to get the telephone microphone acoustically coupled to the speaker). The battery (which may be of the conventional low profile type used in watches, for example), the miniature speaker, and the Mylar switch in the embodiment shown may be entirely conventional (except insofar as they are included in the invention as a whole), and as such, need not be described in any further detail.

Figure 3:
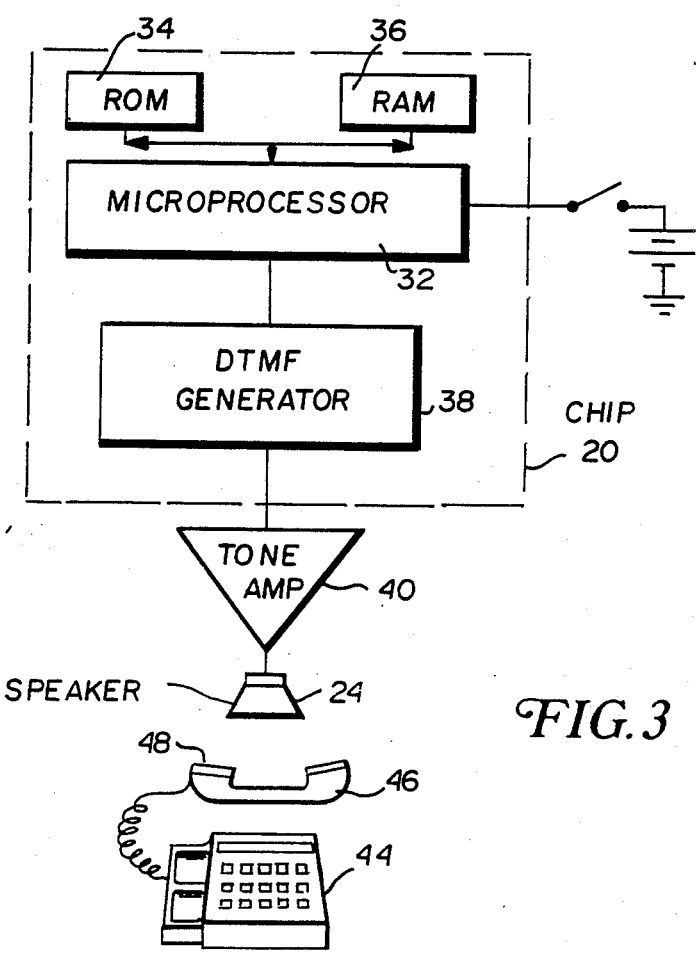
FIG. 3 is a schematic diagram illustrating an automatic dialing mechanism in accordance with the invention, shown in conjunction with a conventional telephone.

With reference now to FIG. 3, it will be appreciated that the tone generator chip 20 includes a microprocessor 32, an appropriately sized read only memory (ROM) 34 and random access memory (RAM) 36. Further details relating to the structure and operation of tone generator chip 20 may be found in "A 4-bit Microcomputer HD61827 for Telephone Subset" published in *Hitachi Review* Volume 34, No. 6 (1985).

The polyphonic Hitachi HD61827 is suitable because of its small size, low power consumption, programmability and ready availability. However, any miniature low power programmable DTMF tone generator circuit could be used instead. For example, a custom designed VLSI DTMF tone generator circuit which does not include features of the Hitachi chip which are not used in the above described embodiment (e.g., an LCD display driver) might be used to realize lower cost at high volumes. In addition, a pair of monophonic chips, actuated simultaneously to produce a DTMF tone pair could also be employed.

Also included in tone generator chip 20 is a DTMF generator 38 which decodes a preprogrammed telephone number stored in ROM 34 (under control of program control software stored in ROM 34) and generates a sequence of corresponding DTMF tones which are fed to a conventional low power audio amplifier 40. Amplifier 40 (which may not be necessary if the direct output of DTMF generator 38 has sufficient amplitude) amplifies the tone signals produced by DTMF generator chip 38 to a level sufficient to drive speaker 24. Speaker 24 converts the amplified tone signals to DTMF acoustic signals which are acoustically coupled (through the air) to a conventional telephone 44 placed in proximity to the speaker. Telephone 44 includes a handset 46 provided with a microphone 48 which is positioned to receive the tones produced by the DTMF generator 38 and thereby effect automatic dialing of the preprogrammed telephone number.

Figure 4:
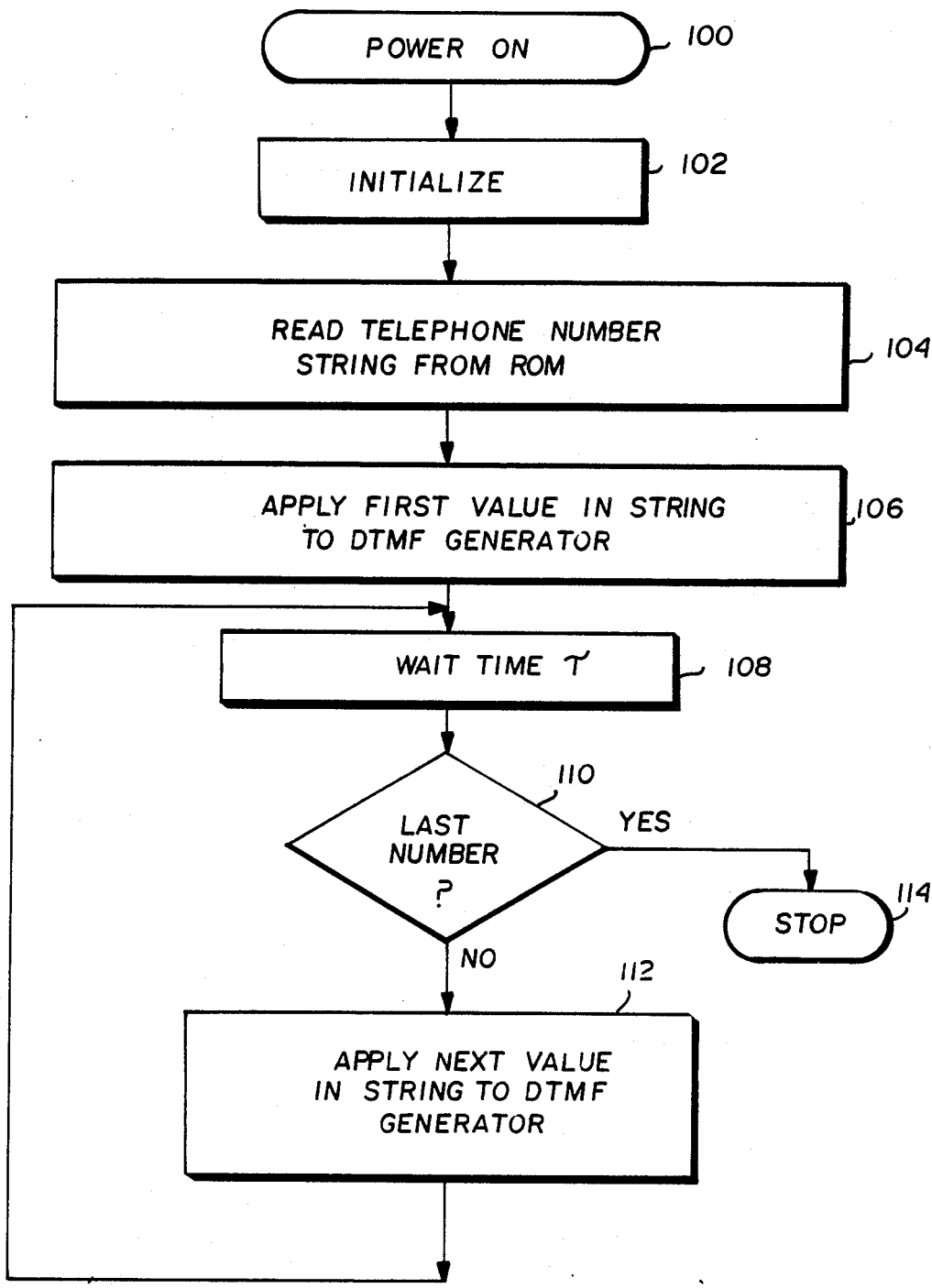
FIG. 4 is a flow diagram illustrating the operation of a microprocessor in an automatic dialing mechanism in accordance with the invention.

FIG. 4 is a flowchart of exemplary program control steps performed by microprocessor 32 to effect dialing of the preprogrammed telephone number in response to the operation of switch 26.

As illustrated therein, switch 26 connects battery 22 to chip 20 in order to conserve battery power during periods when the chip is not operating, and the routine shown in FIG. 4 is executed whenever power is applied to the chip. However, it is also possible to have chip 20 connected at all times to battery 22 and connect switch 26 to a reset pin on the chip (since the Hitachi HD61827 or similar may draw as little as 2 microamps while operating in the "stop" or "sleep" mode).

When switch 26 is actuated (e.g., by opening flap 16, FIG. 4 block 100), microprocessor 32 begins executing program control instructions stored in ROM 34. The first instructions executed by microprocessor 32 initialize internal registers, timers and the like in a conventional manner (block 102, FIG. 4). Microprocessor 32 then reads data representing a telephone number (actually a sequence of different values in the range of 0 through 9) stored in ROM 34 (for example, 1-800-123-4567) at block 104 and applies the first value in the string to DTMF generator 38 (block 106). DTMF generator 38 produces the DTMF tone pair corresponding to the first value for a time period controlled by microprocessor 32 (block 108) and subsequently ceases to produce the tone pair. The duration of the tone pair produced by DTMF generator 38 should be sufficient to enable the telephone company switch tone decoders to properly detect and decode the tone pair.

Microprocessor 32 then determines whether the tone pair just produced was for the last value in the telephone number sequence (decision block 110). If the last value in the telephone number sequence has not yet been encoded into DTMF tones by generator 38, microprocessor 32 applies the next value in the telephone number sequence to DTMF generator 38—causing the generator to produce a further DTMF tone pair corresponding to this next value (block 112). This process continues until the last value in the telephone number sequence has been encoded into DTMF tones (tested for by decision block 110), at which time tones corresponding to the entire predetermined telephone number will have been produced by speaker 24 and acoustically coupled to the telephone line via handset microphone 48. When the last value in the string has been encoded into DTMF tones, microprocessor 32 executes a "stop" (or similar) instruction (block 114)—which causes chip 20 to enter the "sleep" mode in order to reduce power consumption.

The user may control chip 20 to redial the preprogrammed number (for example, if a busy signal was received or if insufficient acoustical coupling existed between speaker 24 and handset microphone 40) by closing flap 16 and opening it once again. This action causes the FIG. 4 routine to execute all over again.

It will be understood that the automatic dialing card device as illustrated in FIG. 1 generally includes the basic or common structural aspects for all embodiments of the invention. In other words, the FIG. 1 embodiment represents a dialing card which can be modified slightly (as further described and shown with reference to FIG. 5) to serve as an insert for books, magazines, newspapers, direct mail packages, etc., and it also represents a dialing card in the form of a customized personal service card as further described herein.

FIG. 5 illustrates an exemplary embodiment of the invention wherein the card 10 is shown in the form of an insert for a news or other magazine (including the catalogue type) or book 50. In the case of a magazine, the adjacent pages will typically include advertising indicia, indicated by reference numeral 52, related to a source of products, services, or the like, and including an invitation to the consumer to call, using the accompanying card. To facilitate attachment of the card, an additional flap 54 is provided which is slipped through the binding of the magazine in a conventional manner. The magazine (or book) page or pages, as well as the card itself, will also typically include instructions on how to use the automatic dialing card. This arrangement allows the consumer to remove the card and to use it at the time and place of his/her own choosing. By providing advertising indicia as well as instructions on the card itself, the consumer need not retain the magazine per se in order to use the card.

The magazine 50 may be in the form of a shopper's catalogue, or the like, with the card 10 intended to be used to place purchase orders for various items illustrated in the catalogue. The repetitive capability of the card is especially useful in such applications.

For magazines (or other inert media format) advertising items from a single source, the preprogrammed telephone number connects the consumer with a single store, purchasing center or the like. However, where the magazine (or other inert media format) contains items from a plurality of sources, the card 10 will preferably indicate a number of possible extensions, one for each of the product sources. Thus, upon connection with a central purchase order information system, the user merely conveys the appropriate extension, enabling direct connection to the corresponding source.

For direct mail and newspaper applications, the automatic dialing mechanism may be incorporated in a card-like structure shown in FIGS. 1 or 5, depending on advertiser preference, and the configuration of the printed advertising associated therewith.

In still another exemplary embodiment of the invention the two-ply card 10, substantially as shown in FIG. 1, or as shown in FIG. 5 but without the mounting flap 54, may be configured as a customized service card, such as a personal business card incorporating an automatic dialing mechanism as previously described. In this application of the invention, the preprogrammed number will correspond to the home or office number of the distributor of the card. This configuration is particularly advantageous in that the holder of the card need not look up, or remember, the number of the person or business from which the card originates.

Other related applications include customized service cards for accessing clubs and other organizations which profit from repetitive phone calls to 700, 800 or 900 numbers; T.V. home shopping networks (enabling the consumer to purchase a particular item displayed on the T.V. screen); medical information banks; financial or brokerage institutions; retail outlets; political campaign centers; subscription services; community service "bulletin boards"; news and sports updating services; long distance dialing cards; and credit cards.

For any or all of such customized service card applications, it is preferred to construct the card of durable plastic material to insure the long life of the card, particularly since these cards are designed for repeated use.

Figure 6:
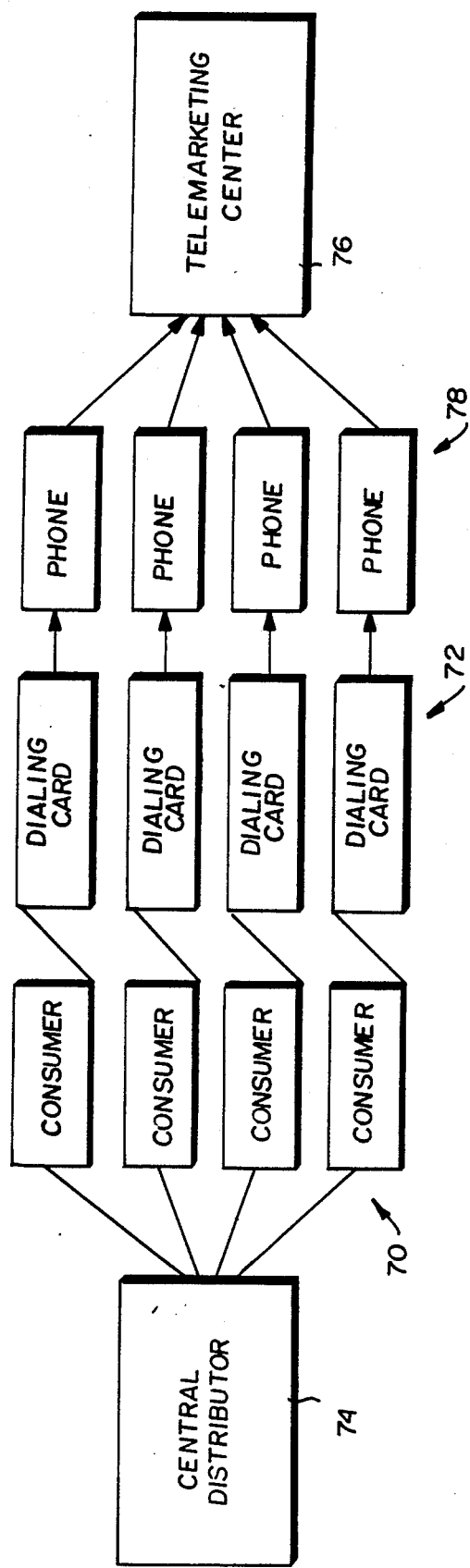
FIG. 6 is a flow chart illustrating an exemplary use for the subject invention.

With reference to FIG. 6, an exemplary distribution flow chart illustrates the concept of the invention and, particularly, the manner by which a plurality of consumers 70 are provided with automatic dialing cards 72 through the mass distribution of magazines (including catalogues), books, and newspapers (whether by subscriptions or by retail sales of the same) or direct mail packages from a central distributor 74. With such mass distribution techniques, many consumers (obviously many more than indicated in FIG. 7) are each provided with an automatic telephone dialing card permitting direct access to, for example, a common telemarketing center 76 through their own, or other, telephones 78. Stated quite simply, the described inert media formats may be directly linked to an interactive media such as a centralized telemarketing or other information or referral system, by means of the automatic dialing card described herein.

The significant advantages of the system illustrated in FIG. 6 are ease of response by the consumer, along with the freedom to activate the card at the time and location of his/her choice, merely by holding the card to the microphone of a telephone.

Figure 7:
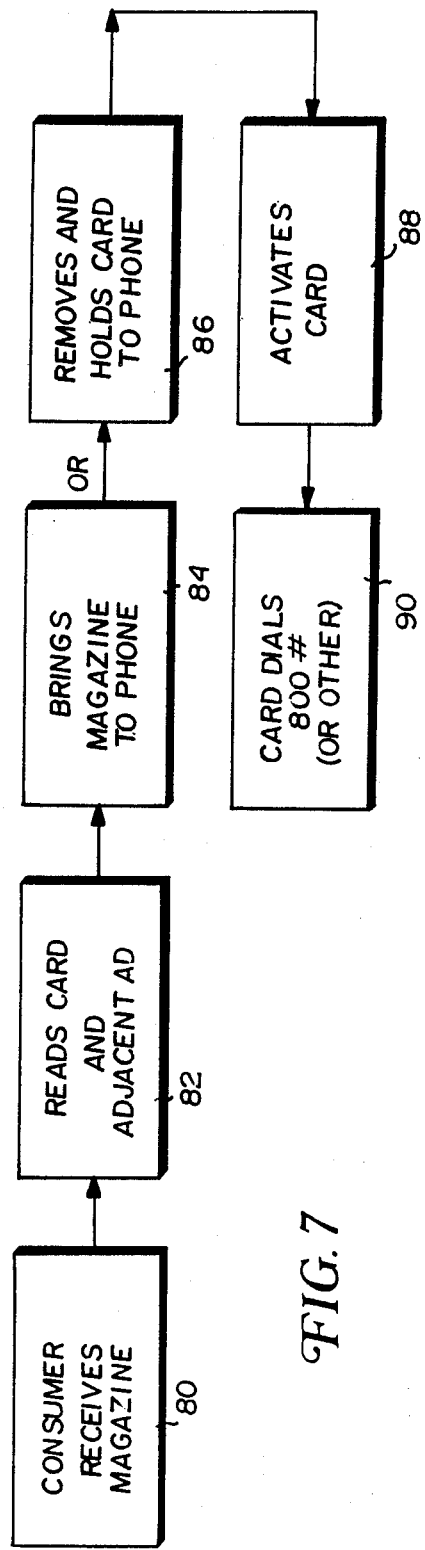
FIG. 7 is a flow chart illustrating front end user interaction with the subject invention.

FIG. 7 is an exemplary flow chart which illustrates in greater detail the "front-end" interaction of a consumer. Initially, the consumer receives a magazine or other mass-distributed, inert media product which includes advertising and other product or service information in print, along with an automatic dialing card (block 80). During the course of reading the magazine, the consumer will read the advertisement and related information concerning the use of the card (block 82). If the consumer desires to make immediate use of the card, he/she can then bring the magazine into close proximity with a phone hand set (block 84), or first remove the card from the magazine and hold the card next to the phone hand set (block 86). By then opening the flap associated with the automatic dialing device, the card is activated (block 88) to automatically dial, for example, a 700, 800 or 900 number preprogrammed into the device (block 90). In this manner, the consumer interacts quickly and directly with the telemarketing or other system using touch tone and voice communication.

While the process of using the card has been described primarily with respect to a telemarketing system (automated or otherwise), the preprogrammed telephone may connect the user with any of several sources related to the various card applications as already described.

Figure 8:
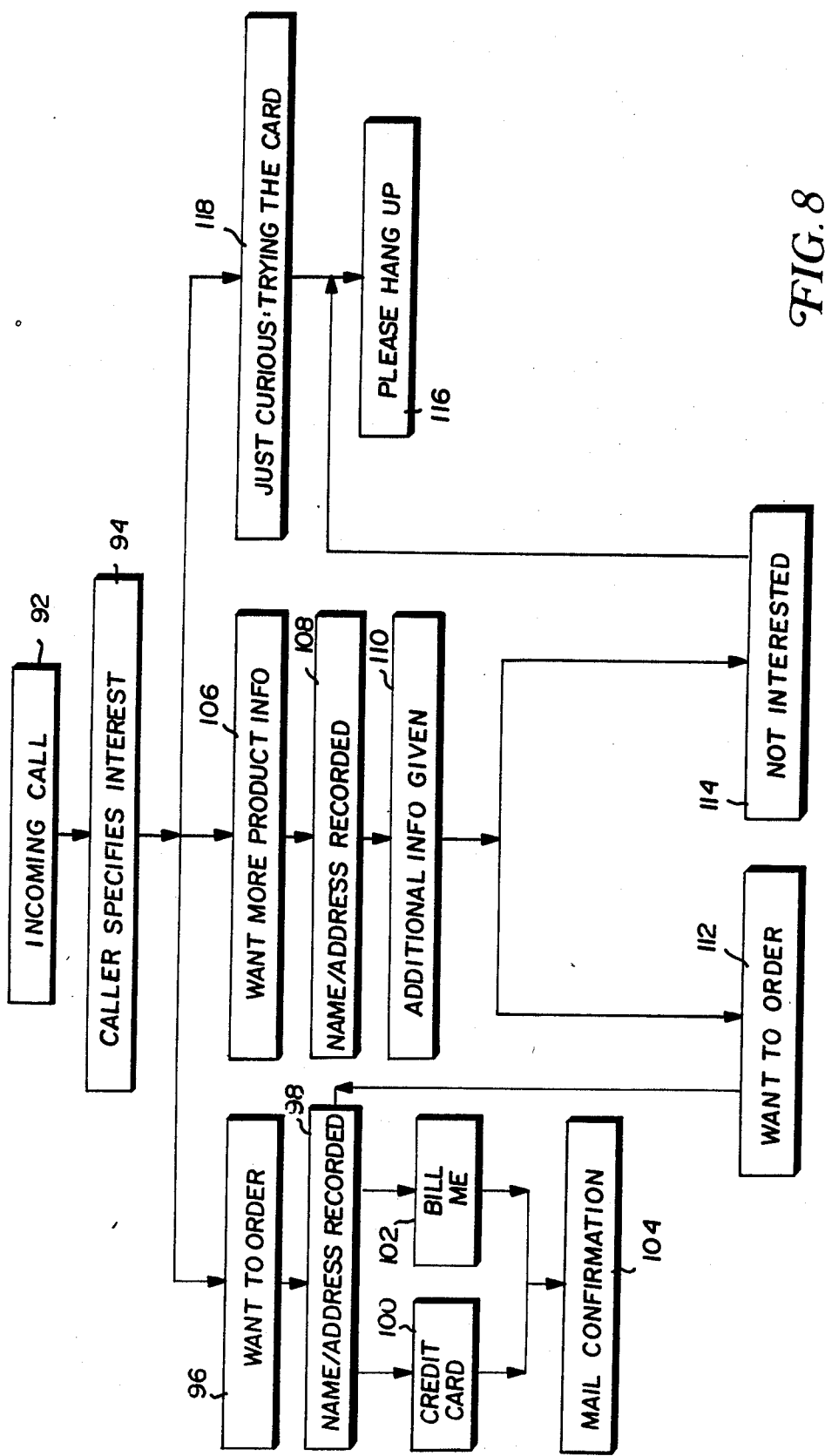
FIG. 8 is a a flow chart illustrating back end interaction with a telemarketing system in accordance with an exemplary embodiment of the invention.

FIG. 8 illustrates, in exemplary form, a "back-end" interaction system wherein a conventional telemarketing system (which may use a conventional live operator system or computer driven system utilizing electronic voice techniques), receives an incoming call from a consumer (block 92) and directs the caller, as appropriate, depending on caller interest (block 94). For example, a caller may wish to order a particular product or service brought to his/her attention by a specific inert media format (block 96). In this case, further information is recorded relating to the item to be ordered, consumer name and address (block 98) and method of payment (blocks 100, 102). The order may then be confirmed by mail (block 104). Other callers may merely want more product information (block 106), in which case such additional information is provided (block 110) after having recorded the consumer's name and address (block 108) and subsequently, a determination is made by the consumer whether or not to make a purchase (blocks 112, 114). If not interested, the caller is advised to immediately hang up (block 116) and thus conserve unnecessary telephone use time charges. A third category might be consumers who are merely trying the card out of curiosity (block 118), and in order to conserve on-line time, these callers are also encouraged to hang up (block 116). It is to be understood that the back-end system described may be fully automated with current state-of-the-art communication systems, or it may be done using a traditional live operator system.

Figure 9:
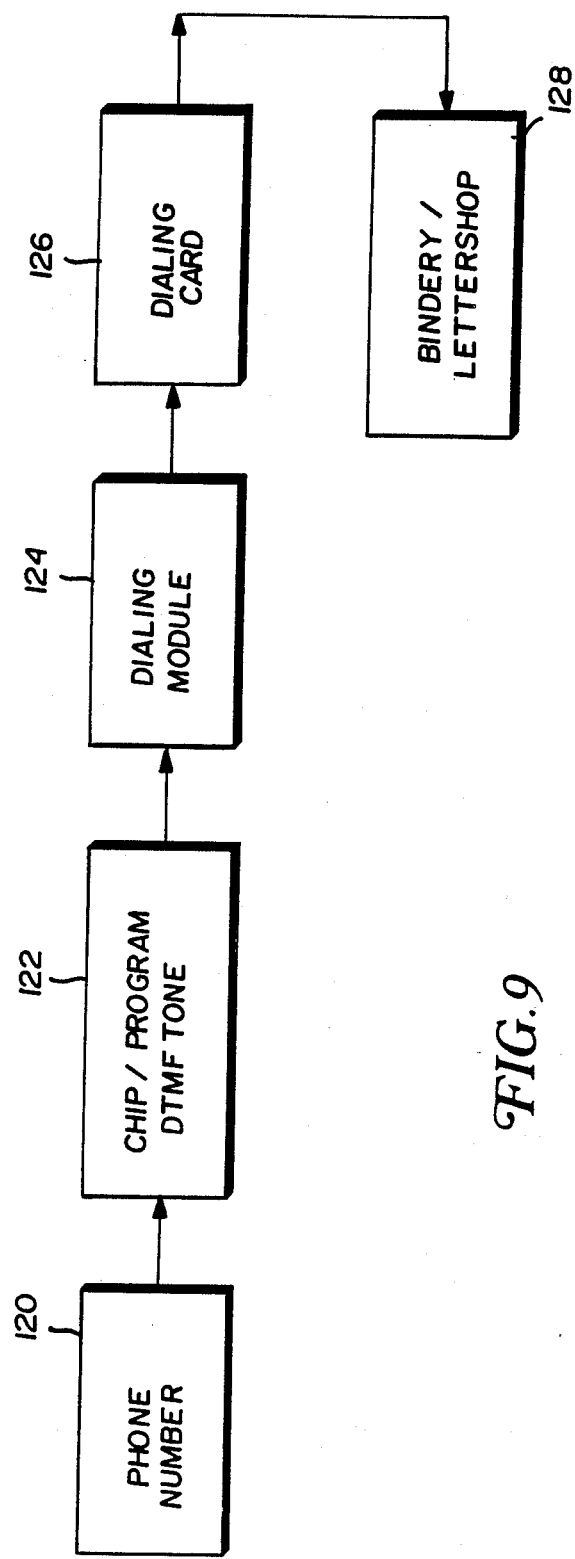
FIG. 9 is a flow chart illustrating an exemplary process for manufacturing an automatic dialing mechanism in accordance with the invention.

With reference now to FIG. 9, an exemplary flow chart illustrates, broadly, one manufacturing process for making automatic dialing cards in accordance with the present invention. Initially, a specific telephone number is provided by a phone company (block 120) and programmed into the microprocessor chip (block 122). The chip is then integrated into a durable dialing module or mechanism, including speaker, battery, Mylar on/off switch or other suitable actuation device (block 124).

Subsequently, the dialing module is incorporated into a two-ply card on which instructions for use and advertiser's message is printed, if applicable, depending on the type of card being made (block 126). In one exemplary embodiment, the dialing card is then removably bound into a magazine or other inert media product as previously described, at a bindery or lettershop (block 128). The inert media product with automatic dialing card is then ready for mass distribution and for subsequent reception by individual users and/or consumers.

In order to reduce costs, it is possible to manufacture a chip preprogrammed with a single telephone number which may nevertheless connect consumers with any one of, for example, ten or more sources. This is accomplished, as mentioned above, by additional use of extension numbers, specific to a single source (and thus included in related advertising) and supplied by the user when connected to the central telemarketing or other information referral service.

Figure 10:
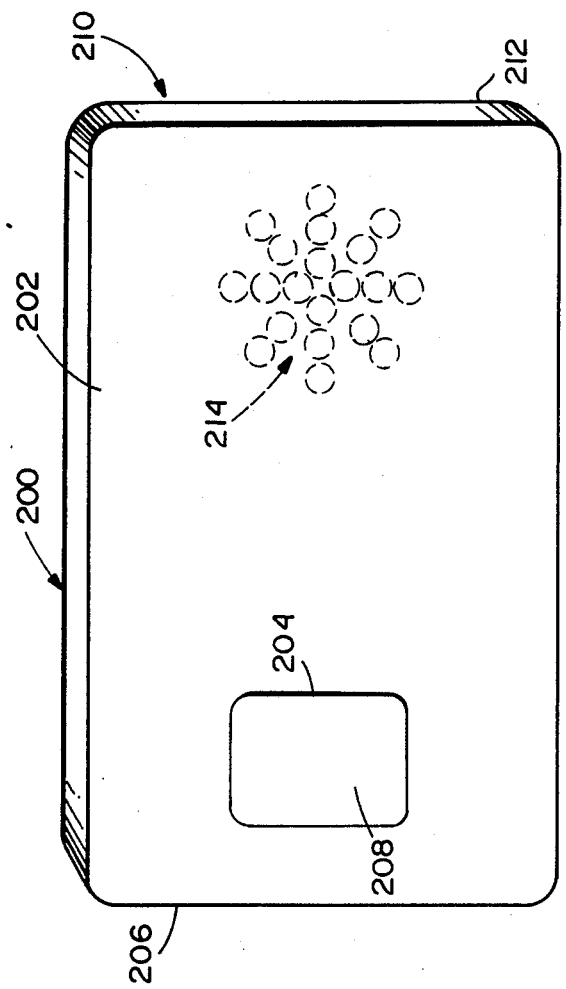
FIG. 10 is a perspective view of a further exemplary and presently preferred embodiment of the invention.

FIGS. 10-15 illustrate a further and presently preferred exemplary embodiment of the invention in accordance with this continuation-in-part application. This further embodiment is configured in the approximate shape and size of a compact "credit card" type housing. Referring particularly to FIG. 10, housing 200 has dimensions on the order of 76.5 mm long, 46.5 mm wide, and 8.5 mm thick and is fabricated from a combination of relatively rigid vinyl and high impact styrene plastic (as will be described shortly). The planar top housing wall or cover 202 is provided with an aperture 204 near one end 206, with a user actuable push button 208 accessible through the aperture. Adjacent the other end 210 of the housing, there are provided in a bottom wall 212 a pattern of separated speaker holes 214, each having a diameter of about 2.5 mm (about twenty such holes are provided in a generally circular pattern in the preferred embodiment).

Figure 11:
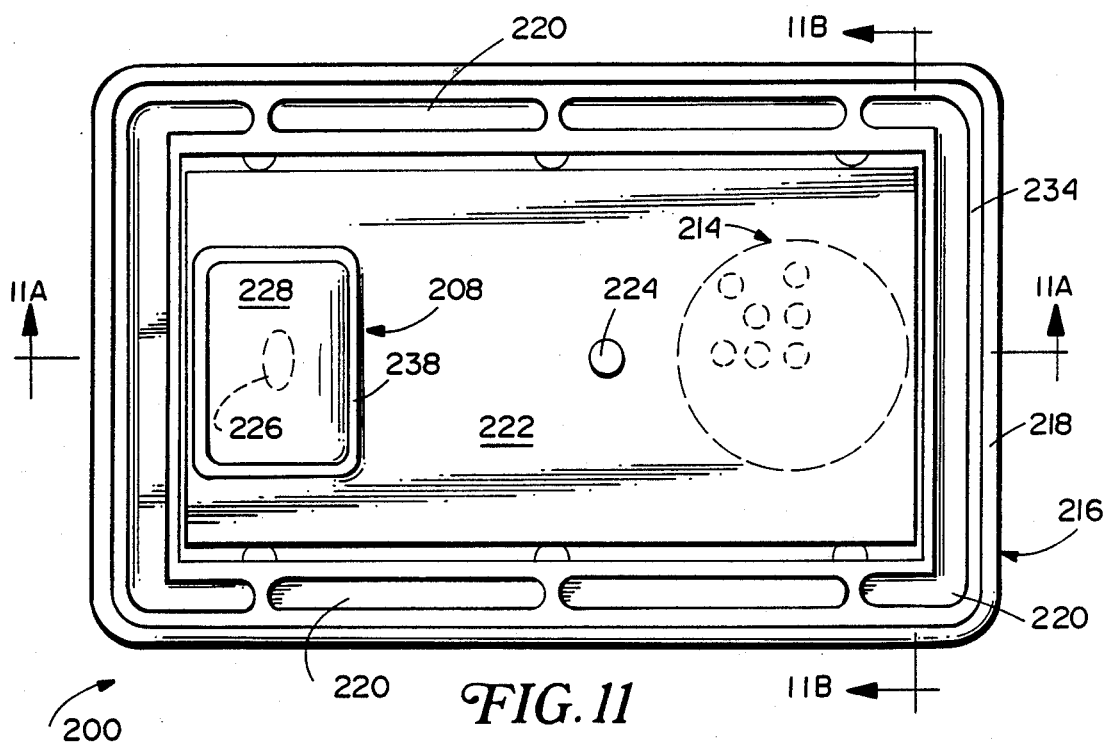
FIG. 11 is a plan view of the embodiment illustrated in FIG. 10, but with the cover removed and with the electrical circuit and speaker omitted for clarity.
Figure 11A:
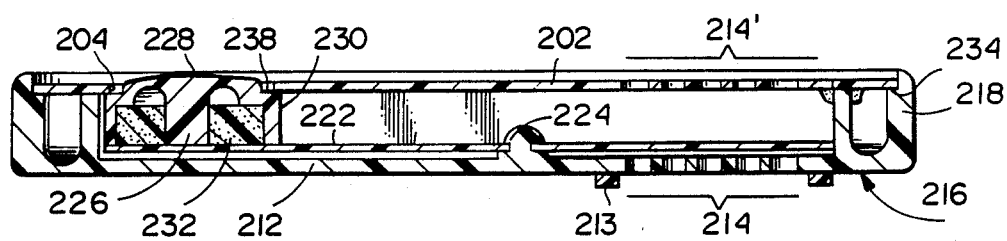
FIG. 11A is a section view taken along the line 11A–11A in FIG. 11, and with the top cover in place.
Figure 11B:
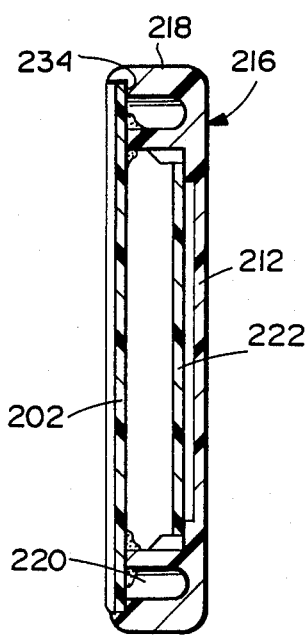
FIG. 11B is a section view taken along line 11B–11B in FIG. 11, and with the top cover in place.

With reference now to FIGS. 11 through 11B, the overall construction and interior details of the housing 200 is shown in detail. Thus, the housing 200 includes a unitary base portion 216 comprised preferably of high impact styrene plastic. The base 216 has an upstanding peripheral sidewall 218 which is formed with cut-out portions 220 to thereby lighten the overall weight of the device without unduly sacrificing strength. The peripheral sidewall is integrally formed with the lower or bottom wall 212 which, as already mentioned, is formed with a pattern of separated holes 214.

A printed circuit board 222 is mounted within the housing adjacent bottom wall 212 and staked thereto by means of an integral plastic rivet 224. The push button 208 is mounted on one side of the circuit board, and includes a centrally oriented thrust portion 226, a touch surface 228, and a surrounding skirt portion 230 which is supported by the board 222. A resilient foam spacer block 232 surrounds the thrust portion 226, biasing the latter upwardly away from the switch elements as described in detail below. The button 208 is preferably constructed of a polypropylene, while block 232 may be of any conventional resilient foam composition.

The top wall or cover 202, preferably constructed of a relatively rigid vinyl, overlies the circuit board 222 in vertically spaced relationship thereto, the cover being adhesively attached an undercut peripheral surface 234 of the peripheral sidewall 218. The aperture 204 formed in top wall 202 is slightly smaller than the button periphery so as to overlap a peripheral edge 238 of the button, as best seen in FIG. 11A. This arrangement retains the button within the housing 200.

It will further be seen from FIGS. 11A and 11B that the outer edge of the peripheral sidewall extends slightly above the upper surface 228 of button 208 so that a plurality of cards may be stacked (individually or after attachment to print media such as newspapers, magazines, etc.) without inadvertent actuation of the switches.

While the electrical circuit battery and speaker are not shown in FIGS. 11 through 11B (merely for the sake of clarity), it will be understood that the speaker will be located adjacent the pattern of holes 214 so that the card is easily manipulable by the user, i.e., holding the card between the thumb and index finger, the button 208 can be depressed with the thumb while the underside of the card is held against the microphone of a telephone handset.

Figure 12:
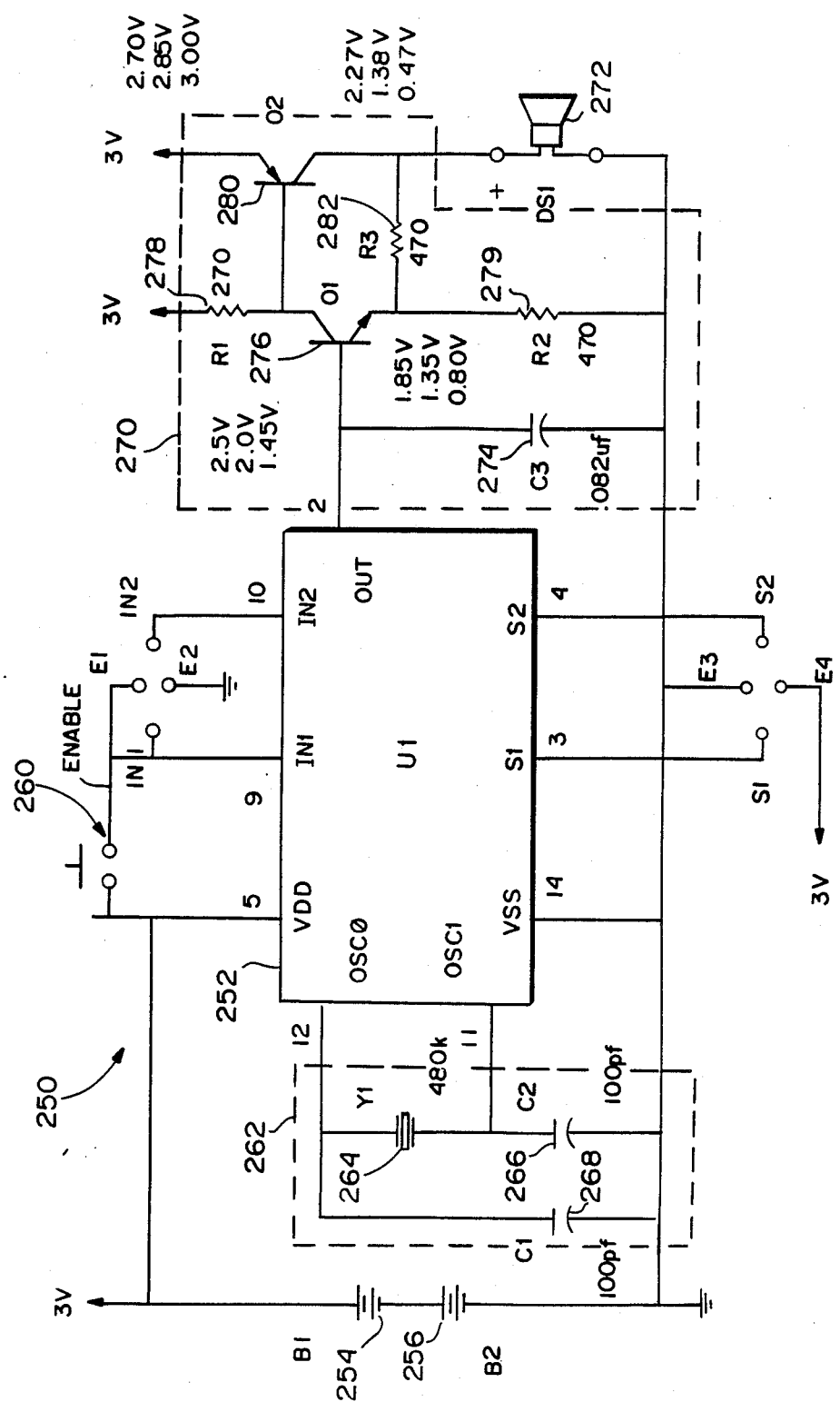
FIG. 12 is a schematic diagram of the electrical circuit within the embodiment shown in FIG. 10.

FIG. 12 is a detailed schematic diagram of an exemplary and presently preferred dialing electrical circuit 250 disposed on/defined by the printed circuit board 222 shown in FIG. 11. The heart of circuit 250 is a ROM based stored number DTMF dialer integrated circuit 252 type UM95081 (hereafter referred to as "chip 252") manufactured by United Microelectronics Corp. (UMC) of Hsinchu, Taiwan. A full description of this chip 252 may be found in UMC preliminary technical specification PT8712E.REV. 1.0 entitled "UM95080/81 One Key Dialer". Briefly, the type UM95081 integrated circuit is a ROM based single chip DTMF dialer which can dial a preselected telephone number by pushing a single key. An 8-pin version of the chip (type UM95080) can be used for dialing a single telephone number, but the preferred embodiment of the present invention uses the 14-pin UM95081 which has the ability to dial a full selection of a series of eight telephone numbers. This chip 252 operates over a voltage range of 2–5 VDC, draws an operating current of 0.7 mA, and draws a standby current of about 2 microamps. The chip 252 produces a single column tone output amplitude of 778 mV into a 15 Kilohm load at 5% distortion. A 480 kHz external ceramic oscillator must be connected externally to provide a clock signal. A local/long distance pin selects between local and long distance calls. The chip 252 also includes a test pin and testout pin which provides test tone outputs on command. Pins S1 and S2, and IN1 and IN2 are used to select which one of eight telephone number sequences prestored in an internal ROM is to be generated at the TONE output in accordance with the following Table I truth table:

| Telephone No. | IN1 | IN2 | S1 | S2 |
|---|---|---|---|---|
| 0ZZ | 1 | 0 | 0 | 0 |
| 1ZZ | 1 | 0 | 0 | 1 |
| 2ZZ | 1 | 0 | 1 | 0 |
| 3ZZ | 1 | 0 | 1 | 1 |
| 4ZZ | 0 | 1 | 0 | 0 |
| 5ZZ | 0 | 1 | 0 | 1 |
| 6ZZ | 0 | 1 | 1 | 0 |
| 7ZZ | 0 | 1 | 1 | 1 |

(where 0ZZ–7ZZ represent eight different prespecified telephone numbers). Thus, the inputs IN1 and IN2 are set alternatively low and high to select between two banks of four prestored telephone numbers, and the inputs S1 and S2 are used to select which one of the four telephone numbers in the selected bank is to be generated in DTMF form. The manufacturer preprograms the chip 252 at time of manufacture (by use of conventional masking techniques) for eight different customer specified telephone numbers. Since the masking/fabrication process is relatively expensive, all eight telephone numbers are preprogrammed in the preferred embodiment. In this way, identical chips 252 can be used for different parts of the country, or the world, or even for different call-in services altogether. In the preferred embodiment, one of the eight preprogrammed numbers is hard-wire selected at time of assembly of circuit 250 (through use of jumpers as will be explained). As a result of the "fixed" use of the device, it will be appreciated that no data input keys or display window is needed, thereby simplifying and reducing the cost of the device.

Power provided by series connected battery cells 254, 256 (each type LR43 manganese dioxide 1.5VDC button cells 11.6 mm in diameter and 4.2 mm in height in the preferred embodiment) is directly connected to the $V_{DD}$ input pin of chip 252, and power is thus applied to the chip at all times (this is possible because of the extremely low quiescent current draw of the chip). The cells 254, 256 provide a sufficient mA-hours rating such that each dialing requires only an infinitesimal amount of the cell current capacity and the standby current draw of the entire circuit 250 is sufficiently small compared to it such that a shelf/storage life of several years is provided.

An enable signal generated by a user-depressable switch 260 (a SPST momentary contact switch connected between battery 254 and jumper terminal E1 and actuable via push button 208) is applied to either the IN1 or the IN2 input of chip 252 depending upon the specific jumper configuration used (in the preferred embodiment, the E1 jumper terminal is connected to one of the IN1 terminal and the IN2 terminal, and the terminal IN1/IN2 not connected to E1 is connected to ground via jumper terminal E2—so only one of the bank of four prestored telephone numbers corresponding to terminal IN1 and the bank of four telephone numbers corresponding to bank IN2 is selected. Jumper terminals E3 (ground) and E4 (+3VDC) are similarly connected in various combinations to chip 252 terminals S1, S2 as set forth in Table I above to select one of the four telephone numbers in the bank of numbers selected by jumpers IN1, IN2. These jumper configurations are all selected in the preferred embodiment by hardwired connection at time of manufacture (e.g., by providing 8 different versions of PC board 222 or by manually connecting appropriate pads on the PC board) in order to select one of the eight prestored numbers. It is that single selected number that is produced whenever the user closes switch 260.

It is within the scope of this invention, however, to have two or more numbers hardwired at the time of assembly, thereby affording the user the ability to select, by corresponding switch means, which of the two or more numbers is to be dialed. In any event, the user is precluded from any use of the device other than that intended by the distributor. In other words, the user cannot program any new numbers into the device—it can only dial the one or more numbers which are preprogrammed at the time of manufacture/assembly.

An external oscillator circuit 262 including a 480 KHz ceramic resonator 264 (preferably having a series resistance at resonance of 30 Ohms and a surface mount package configuration) is connected between the OSC0 and OSC1 terminals of chip 252. A 100 pf multilayer ceramic chip capacitor 266 is connected in series with resonator 264, and another 100 pf multilayer ceramic chip capacitor 268 is connected in parallel across the series-connected resonator and capacitor 266. Oscillator circuit 262 provides a relatively stable 480 KHz frequency signal which chip 252 divides down into the various different standard DTMF tone frequencies.

The output of chip 252 (available on the pin "OUT") is connected to the input of an external audio amplifier circuit 270, and the output of the audio amplifier circuit is in turn connected to drive a miniature speaker 272. The type of speaker 272 used is rather critical to the operation of the preferred embodiment. Speaker 272 should be small in size, low in cost, and have a reasonably high coil impedance—all conflicting design criteria. Speaker 272 in the preferred embodiment is a Vansonic Enterprise Co. type 20FS50G (ferrite) speaker having a 50 Ohm coil resistance, a polarity such that the voice coil moves forward with a positive DC current applied to the speaker "+" terminal, and a minimum audio output level of 92 dB SPL (ref. 0dB=0.0002 microbars at 10 mm) between 700 Hz and 1500 Hz. Preferably, speaker 272 delivers an output between 100 Hz and 700 Hz that does not exceed 5 dB in excess of the output between 700 Hz and 1500 Hz, and an output between 1500 Hz and 7 kHz that does not exceed +8 dB per octave (starting at 1500 Hz) in excess of the maximum SPL in the 700–1500 Hz range. The preferred dimensions of speaker 272 are 20 mm in diameter and 4.2 mm in height, with a mass of 1.8 grams or less.

To further enhance the reliability of the DTMF signalling over a wide variety of telephones, an annular, acoustical sealing ring 273 is secured to the wall 212 of the housing 200, surrounding the speaker holes 214. The ring 273 is preferably of a rubber construction, although other resilient polymeric material may also be employed. The ring is adapted to engage the telephone microphone housing, and has a maximum outer diameter of about 1.125" and a minimum inner diameter of about 0.875". In this regard, only a partial acoustical seal with the microphone is required, i.e., the ring should not be so large as to surround all of the speaker holes on the microphone housing. The ring is preferably about ⅛ to 1/16 inch in thickness.

Speaker performance is further enhanced by providing a plurality of vent holes 214', for example, in the wall 202 immediately behind the speaker, opposite the speaker holes 214 in wall 212. The vent holes may be located elsewhere, so long as acoustical freedom is provided the speaker. The equivalent of six holes, each 0.062 inch in diameter, is sufficient.

Audio amplifier 270 provides impedance matching between the OUT output of chip 252 and the input terminals of speaker 272, also provides sufficient amplification to ensure that the audio output generated by the speaker is sufficient to reliably dial a telephone line, and acts as a level shifter to ensure that the full 3VDC power supply voltage is available to drive the speaker. The configuration of audio amplifier 270 will now be described.

A multilayer ceramic chip capacitor 274 (having a value of 0.22 microfarads in the preferred embodiment) is connected between the OUT chip output terminal and ground potential, and the OUT chip output terminal is also connected to the base of an NPN bipolar junction transistor 276. Transistor 276 may be a generic silicon small signal class transistor having a 250 mw power dissipation, an $H_{fe}$ of 100 min, 200 max at IC=5 ma, and a $V_{BE}$ in saturation of 0.65V at IC=5 ma, IB=0.05 ma. A 270 Ohm resistor 272 is connected between the collector of transistor 276, and a 470 Ohm resistor 279 is connected between the emitter of the transistor and ground. The collector of transistor 276 is also directly connected to the base of a further transistor, this further transistor being a generic PNP type Bipolar Junction transistor with substantially the same power dissipation and gain as transistor 276 but preferably with a saturation $V_{BE}$ of 0.8V at IC=50 ma, IB=0.5 ma. The emitter of transistor 280 is connected directly to the "+" power supply provided by cells 254, 256, and the collector of this transistor is connected to ground through speaker 272. In addition, a 1000 Ohm resistor 282 is connected between the emitter of transistor 276 and the collector of transistor 280.

Battery voltage sag may be considerable under full load, as the voltage values shown on FIG. 12 indicate. However, the audio amplifier 270 circuit configuration shown in FIG. 12 is self-biasing even under widely varying power supply voltages. Transistors 276 and 280 together act as a non-inverting feedback amplifier with a gain of 3.0. The amplification gain is set by the ratio of resistor 279 (R2) to the ratio of resistor 282 (R3) in accordance with the relationship (R2+R3)/R2. Biasing is provided by resistors 272 and 279 such that transistors 276 and 280 are both cut off when no audio is generated at the OUT terminal of chip 252 (i.e., the audio amplifier draws virtually no current under quiescent conditions). The amplifier 270 output impedance is essentially zero ohms because of the feedback path through transistor 280 and resistor 282, and the amplifier is stable and does not oscillate. The audio amplifier 270 configuration shown in FIG. 12 provides sufficient signal to drive the speaker 272 so that a −17 dBm SPL output is provided to the telephone line for virtually any type of telephone handset, old or new (so long as the speaker 272 is placed sufficiently close to the telephone handset).

One of the problems with using inexpensive DTMF dialer circuits such as chip 252 is that they use only a few digitizer "steps" (e.g., 12) to produce each tone in order to reduce circuit complexity. This unfortunately results in significant quantization noise. Commonly available speakers such as speaker 272 exhibit a large frequency response peak above the DTMF range, causing the quantization noise to become even more pronounced in the audio output and actually adversely affect DTMF signalling reliability. Capacitor 274 together with the internal source resistance of chip 252 form a low-pass filter having a cut-off frequency of about 500 kHz. The filter produces a reverse tilt to the DTMF tone pairs of 5 dB between the lowest tone (697 Hz) and the highest tone (1477 Hz). This low-pass filter is also important since it significantly reduces the contribution of quantization noise to the final output and thus improve the reliability of the DTMF signalling produced by even a relatively inexpensive and unsophisticated DTMF dialer chip.

The configuration of switch 260 is another important consideration in the preferred embodiment. The devices must be "stackable" (e.g., inserted into magazines which are then stacked into high stacks) without any of switches 260 being closed by the weight of devices stacked above them. In addition, switch 260 must be capable sitting dormant without being operated for long periods of time (e.g., months) and then reliably making contact when depressed. Moreover, switch 260 must be very compact in size and low in cost.

FIGS. 13–15 show an exemplary structure for switch 260 in exploded and cross-sectional views, respectively. Switch 260 in the preferred embodiment includes conventional opposed intermeshed but non-contacting E- shaped copper pathway patterns 290, 292 disposed on PC board 222, with one of the patterns being connected to +3VDC and the other pattern being connected to the E1 jumper terminal. When the two conductive patterns 290, 292 are electrically connected together, an electrical connection is established between cell 254 and jumper terminal E1—and the "enable" signal discussed previously is generated to control chip 252 to generate the DTMF tones corresponding to the single preprogrammed telephone number selected by the hardwired jumpers. A pushbutton spacer ring 294 is disposed on (over) patterns 290, 292—this space ring being rectangular in shape in the preferred embodiment (and having dimensions of about 20 mm by 15 mm) and defining a centrally located circular hole 296 (10 mm in diameter in the preferred embodiment) in registry with the conductive patterns 290, 292. In the preferred embodiment, spacer ring 294 is made of a Mylar sheet 298 having a thickness of 0.05 mm and covered on each side with permanent pressure sensitive adhesive films 300, 302 (see FIG. 14). For ease of final assembly, spacer rings 294 are preferably separately manufactured and covered with medium tack release paper supplied in continuous roll form 15 mm wide.

The spacer ring 294 is preferably placed onto the printed circuit board 222 with hole 296 in registry with the conductive E patterns 290, 292 and the pressure sensitive adhesive film (e.g., film 300) adhering the ring to the PC board. An additional component of switch 260 used to make momentary contact between conductive patterns 290, 292 is a rectangular Mylar film 304 0.025 mm thick having a gold film 0.0064 mm thick deposited on both sides using vacuum deposition techniques. Film 304 is preferably of the same dimensions as spacer ring 294—20 mm long by 15 mm wide—and is adhered to the spacer ring over the hole 296 (e.g., by the pressure sensitive adhesive film 302).

The spacer ring 294 normally prevents gold-covered Mylar film 304 from contacting conductive patterns 290, 292. However, when pressure is exerted upon the portion of Mylar film 304 disposed over hole 296 by means of thrust portion 226 of the push button 208, the Mylar film stretches into the hole (see FIG. 15A) and simultaneously contacts conductive patterns 290, 292 (the gold deposed on the film permitting current to flow between the two patterns). When pressure ceases to be exerted upon the Mylar film 304, the Mylar film returns to its original shape spaced away from the conductive patterns 290, 292 by spacer ring 294. The pressure required to deform Mylar film 304 sufficiently to establish electrical contact between patterns 290, 292 is sufficiently great that more force than the weight of stacked magazines on pushbutton 208 in contact with the film is needed to activate device 250. This feature, along with the height of the peripheral wall 218, serve to effectively prevent accidental acutation of the switch. In fact, the only way activation can occur under all normal handling conditions is for someone to depress pushbutton 208 with his finger.

A small hole 306 is drilled through PC board 222 to open into the airtight chamber 308 defined between the PC board, the circular wall of spacer ring hole 296, and Mylar film 304 so that any extreme air pressure differences which might exist between the chamber within spacer ring hole 296 and the outside air (e.g., such pressure differences might occur if the device were transported in an unpressurized jet cargo bay) can be equalized.

After assembly, the final product can be tested effectively by holding the completed assemblies up to an automatic tester and depressing the pushbutton. The automatic tester can monitor the generated tone sequence for the proper tones and for a sound pressure level which exceeds a minimum acceptable SPL (as discussed previously). The tester can provide a simple GO/NOGO indication (e.g., a green light) based on these SPL and tone sequence measurements. Preferably, each unit should be tested individually so that 100% of the units leaving the manufacturer are known to work properly.

While the invention has been described in connection with what is presently considered to be the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A thin, pocket size automatic dialer comprising:
a portable housing having a bottom wall, peripheral sidewall and top wall;
an automatic dialing device mounted within said housing including means for dialing only a single preprogrammed telephone number associated with a source of goods or services, said means including a speaker adjacent one end of said housing for acoustically coupling said dialing device to a telephone microphone, and wherein speaker holes are provided in said bottom wall adjacent said speaker;
a power source for supplying power to said dialing device, and
a single switch mounted in said housing adjacent the other end of said housing and accessible through an aperture in said top wall of said housing for actuating said dialing device.

2. A pocket size automatic dialer according to claim 1 wherein said peripheral sidewall extends above said top wall to prevent accidental actuation of said switch when said device is in a stack of similar devices.

3. A pocket size automatic dialer according to claim 1 wherein said peripheral sidewall is formed with a plurality of cut-out portions.

4. A pocket size automatic dialer according to claim 2 wherein said peripheral sidewall includes an undercut peripheral surface supporting said top wall.

5. A pocket size automatic dialer according to claim 1 wherein said automatic dialing means includes a circuit board mounted to said bottom wall by means of an integral rivet.

6. A pocket size automatic dialer according to claim 1 wherein said dialer is about 76 mm long, about 46 mm wide and about 8 mm thick.

7. A pocket size automatic dialer according to claim 1 wherein said bottom wall and peripheral sidewall comprise high impact styrene plastic, and said top wall comprises a relatively rigid vinyl.

8. A telephone dialing system comprising:
momentary switch means for producing an electrical enable signal upon manual operation thereof by a user;
preprogrammed digital integrated circuit DTMF dialing means coupled to said switch means for producing at an output terminal thereof an output audio signal sequence corresponding to a predetermined fixed telephone number in response to receipt of said enable signal;

filter means connected to said dialing means output terminal for reducing the level of quantization noise in said output audio signal sequence; and output means, connected to receive said output audio signal sequence as filtered by said filter means, for converting said output audio signal sequence to acoustical signals suitable for effecting automotive telephone dialing through acoustical coupling to a standard telephone handset.

9. A telephone dialing system as in claim 8 wherein said filter means comprises:

the internal source impedance present at said dialing means output terminal; and capacitive means connected to said output terminal for forming a low-pass filtering network in combination with said source resistance, said capacitive means having a capacitance dimensioned such that said formed low-pass filtering network filters said quantization noise from said output audio signal sequence.

10. A telephone dialing system as in claim 8 wherein said output means includes:

a first transistor (Q1) having a base, an emitter and a collector, said first transistor base being connected to said dialing means output terminal;

a first resistor (R1) connecting said first transistor collector to a positive voltage source;

a second resistor (R2) connecting said first transistor emitter to ground potential;

a second transistor (Q2) having a base, an emitter and a collector, said second transistor emitter being directly connected to said positive voltage source, said second transistor base being directly connected to said first transistor collector;

a third resistor (R3) connected between said first transistor emitter and said second transistor collector; and audio transducer means connected between said second transistor collector and ground potential for converting audio signals into acoustical signals.

11. A telephone dialing system as in claim 10 wherein said second and third resistors have substantially identical resistance values.

12. A telephone dialing system as in claim 8 wherein said output means includes:

active amplifier means connected to said dialing means output terminal for shifting the DC level of said output audio signal sequence;

biasing means operatively connected to said active amplifier means for inhibiting said active amplifier means from drawing current except when said output audio signal sequence is present at said dialing means output terminal; and transducer means connected to receive said shifted output audio signal sequence for converting said shifted signal to acoustical energy.

13. A telephone dialing system as in claim 8 wherein:

said dialing means includes internal read only memory means for storing plural fixed preprogrammed telephone numbers, and input terminal means associated with said internal memory means for selecting any of said plural preprogrammed telephone numbers; and said system further includes hard-wired jumper connection means connected to said input terminal means and inaccessible to said user for permanently selecting only one of said plural fixed telephone numbers.

14. A method of fabricating a telephone dialing system including the steps of:

(a) preprogramming a dialing integrated circuit read only memory with plural different fixed telephone number tone sequences at time of manufacture of said integrated circuit;

(b) incorporating said preprogrammed dialing integrated circuit into a portable, self-contained dialing card, said card including a control switch;

(c) installing hard-wired jumper connections into said dialing card and connecting said jumper connections to said dialing integrated circuit;

(d) selecting a subset of said plural different fixed telephone number tone sequences with said installed jumper connections;

(e) manually operating said control switch; and (f) generating one of said telephone number tone sequences in said selected subset with said dialing integrated circuit in response to said operating step (e).

15. A method of fabricating a telephone dialing system including the steps of:

(a) manufacturing a dialing integrated circuit, including the step of preprogramming a read only memory device internal to said integrated circuit with plural different fixed telephone number tone sequences;

(b) incorporating said preprogrammed dialing integrated circuit into a portable, self-contained dialing card, said card including a single control switch;

(c) installing hard-wired jumper connections into said dialing card and connecting said jumper connections to said dialing integrated circuit;

(d) selecting a single one of said plural different fixed telephone number tone sequences with said installed jumper connections;

(e) manually operating said control switch; and (f) generating said single selected telephone number tone sequence with said dialing integrated circuit in response to said operating step (e).

16. A method as in claim 15 further including the step of preventing a user from altering the programming of said read only memory device.

17. A method as in claim 15 wherein said manufacturing step includes the steps of:

generating a mask encoding signals specifying said plural telephone number tone sequences; and fabricating a integrated circuit semiconductor layer internal to said dialing integrated circuit with said mask.

18. A self-contained telephone dialing system comprising:

a card sized portable housing having one end and another end and also having an outer surface and defining an internal space therein, said housing having plural holes defined through said surface at said one end thereof;

miniature battery means disposed in said housing internal space for supplying a DC voltage;

momentary sWitch means disposed on said housing outer surface at said housing other end and connected to said battery means for producing an electrical enable signal upon manual operation thereof by a user;

preprogrammed digital integrated circuit DTMF dialing means coupled to said switch means, connected to always receive said battery voltage and disposed in said housing internal space, for producing at an output terminal thereof an output audio signal sequence corresponding to a single predetermined fixed telephone number in response to receipt of said enable signal;

filter means connected to said dialing means output terminal for reducing the level of quantization noise in said output audio signal sequence;

audio amplifier means, disposed in said housing internal space, connected to said filter means and also always connected to receive said battery voltage, for shifting the DC level of said output audio signal sequence, for amplifying said output audio signal sequence, and for providing a shifted, amplified version of said output audio signal sequence at an output terminal thereof; and audio transducer means, disposed in said housing internal space in registry with said hole patten and connected to said amplifier means output terminal, for converting said shifted, amplified version of said output audio signal sequence to acoustical signals having a sufficient sound pressure level such that automatic telephone dialing occurs when an off hook touch tone telephone handset with dial tone is disposed in proximity to said hole pattern.

19. A system as in claim 18 wherein:

said amplifier means comprises:

a first transistor (Q1) having a base, an emitter and a collector, said first transistor base being connected to said dialing means output terminal, a first resistor (R1) connecting said first transistor collector to said battery voltage, a second resistor (R2) connecting said first transistor emitter to ground potential, a second transistor (Q2) having a base, an emitter and a collector, said second transistor emitter being directly connected to said battery voltage, said second transistor base being directly connected to said first transistor collector, and a third resistor (R3) connected between said first transistor emitter and said second transistor collector; and said audio transducer is connected between said second transistor collector and ground potential.

20. A system as in claim 18 wherein said amplifier means includes self-biasing means for inhibiting said amplifier means from drawing current except when said dialing means produces said output audio signal sequence.

21. A system as in claim 18 wherein:

said dialing means includes an internal fixed-programmed read only memory storing plural different fixed telephone number tone sequences corresponding to plural different telephone numbers; and said system further includes hardwired jumper means disposed within said housing internal space for selecting only one of said fixed telephone number tone sequences and for preventing a user from selecting any other ones of said plural telephone number tone sequences.

22. A telemarketing process for linking individual consumers directly to a source of products or services through mass distributed print media comprising the steps of:

(a) providing from the source an automatic telephone dialing device including a microprocessor preprogrammed to dial a telephone number for said source wherein said device includes advertising associated with said products or services;

(b) detachably mounting said preprogrammed automatic telephone dialing device to a mass distributable media; and (c) mass distributing said media to consumers so that said each of said consumers may directly access the said source of products or services by activating said automatic dialing device adjacent a telephone speaker to thereby automatically dial said telephone number.

23. The process of claim 22 wherein, in carrying out step (b), said media comprises newspapers.

24. The process of claim 22 wherein, in carrying out step (b), said media comprises magazines.

25. The process of claim 22 wherein, in carrying out step (b), said media comprises direct mail advertising.

26. The process of claim 22 wherein said source comprises a telemarketing center.

27. The process of claim 22 wherein said automatic dialing device is capable of dialing only the preprogrammed number.

28. A telemarketing process for linking individual consumers directly to a source of products or services through mass distributed print media comprising the steps of:

(a) providing from the source an automatic telephone dialing device preprogrammed to dial a telephone number for said source;

(b) detachably mounting said preprogrammed automatic telephone dialing device to inert print media, said media including advertising associated with said products or services; and (c) mass distributing said inert print media to consumers so that said each of said consumers may directly access the said source of products or services by activating said automatic dialing device adjacent a telephone speaker to thereby automatically dial said telephone number; and (d) providing a consumer interaction system at said source for processing consumer calls generated by said automatic telephone devices.

29. A process as defined in claim 28 wherein the consumer interaction system is a computer driven system utilizing electronic voice techniques.

30. An automatic telephone number dialing device comprising a relatively thin, portable housing; automatic telephone dialing means mounted within said housing for dialing at least one preprogrammed telephone number and for connecting a user with a source of goods or services; and a single switch for actuating said dialing means; and wherein said housing has no user accessible data input means and no display window means, so that the user cannot alter the said at least one preprogrammed telephone number.

31. An automatic telephone number dialing as defined in claim 30 and further including means for acoustically coupling said card to a microphone of a telephone handset.

32. An automatic telephone number dialing device as defined in claim 31 wherein said housing encloses a speaker and said housing is provided with a plurality of speaker holes adjacent one side of said speaker, and wherein said acoustical coupling means includes an annular ring secured to said housing in surrounding relationship to said speaker holes.

33. An automatic telephone number dialing device as defined in claim 32 wherein said housing is provided with a plurality of vent holes adjacent the other side of said speaker.

34. A telephone dialing system as in claim 8 wherein said filter means produces a reverse tilt to DTMF tone pairs of 5 dB between a lowest tone and a highest tone.

35. A portable, pocket size telephone dialer comprising:
an automatic dialing device for dialing only a single preprogrammed telephone number, one or more battery cells for powering the dialing device, a single switch for actuating the device, and a speaker for acoustically coupling the device to a telephone.

36. A telephone dialer as defined in claim 35 wherein said dialer is devoid of any keys for enabling a user to input data to the dialer, and is devoid of any display window for displaying said preprogrammed telephone number.

37. A telephone dialer as defined in claim 36 wherein said automatic dialing device includes preprogrammed digital integrated circuit DTMF dialing means coupled to the switch for producing at an output terminal thereof an output audio signal sequence corresponding to said preprogrammed telephone number.

38. A telephone dialer as defined in claim 37 wherein said telephone number is associated with a product or service source, and wherein said device has indicia associated therewith related to said product service or source.

39. An automatic dialer comprising:
a portable device provided with information related to goods or services;
automatic telephone dialing means enclosed within said device, said automatic dialing means capable of producing DTMF tones corresponding only to a single preprogrammed telephone number for connecting a user directly with a source of said goods or services;
a power source for supplying power to said automatic telephone dialing means;
a speaker for acoustically coupling said automatic dialing means to a telephone microphone; and
a single switch mounted within said device for supplying power from said power source to said automatic telephone dialing means for dialing said preprogrammed telephone number.

40. An automatic dialer as defined in claim 39 wherein said automatic dialing means includes a DTMF tone generator circuit.

41. A device as defined in claim 39 wherein said microprocessor comprises a single chip microprocessor with an on-chip DTMF tone generator.

42. A portable communications device acoustically coupleable to a telephone microphone comprising:
a microprocessor having a memory sufficient to store at least one telephone number;
means capable of generating dual tone multi-frequency signals corresponding only to a single preprogrammed telephone number;
indicia including advertising for a product or service source associated with said device; and
switch means for activating said microprocessor and said generating means to generate said signals, such that, when said generating means is activated, and when said portable device is placed adjacent a telephone microphone, the preprogrammed telephone number is automatically dialed to connect the user directly with interactive media means at the source of said product or service.

43. A device as defined in claim 42 wherein said microprocessor and said generating means are substantially enclosed between two layers of plastic material.

44. A portable communications device as defined in claim 43 and wherein the device is devoid of user accessible data input keys.

45. A portable communications device as defined in claim 42 wherein said generating means includes a microprocessor with an on-chip DTMF tone generator and a speaker for acoustically coupling the generating means to a telephone microphone.

* * * * *